(12) United States Patent
Kamada

(10) Patent No.: US 9,474,426 B2
(45) Date of Patent: Oct. 25, 2016

(54) CLEANING DEVICE COUPLING INSTRUMENT AND CLEANING DEVICE

(71) Applicants: AKUSESU CORPORATION, Shiga (JP); TSUBAKIMOTO KOGYO CO. LTD., Osaka (JP)

(72) Inventor: Katsuzo Kamada, Konan (JP)

(73) Assignees: AKUSESU CORPORATION, Shiga (JP); TSUBAKIMOTO KOGYO CO. LTD., Osaka (JP)

( * ) Notice: Subject to any disclaimer, the term of this patent is extended or adjusted under 35 U.S.C. 154(b) by 157 days.

(21) Appl. No.: 14/398,309

(22) PCT Filed: May 14, 2013

(86) PCT No.: PCT/JP2013/063381
§ 371 (c)(1),
(2) Date: Oct. 31, 2014

(87) PCT Pub. No.: WO2013/172329
PCT Pub. Date: Nov. 21, 2013

(65) Prior Publication Data
US 2015/0082562 A1 Mar. 26, 2015

(30) Foreign Application Priority Data
May 15, 2012 (JP) .................. 2012-111764

(51) Int. Cl.
*A47L 11/16* (2006.01)
*A47L 11/14* (2006.01)
(Continued)

(52) U.S. Cl.
CPC ............. *A47L 11/164* (2013.01); *A46B 7/04* (2013.01); *A46B 13/008* (2013.01); *A46B 13/02* (2013.01);
(Continued)

(58) Field of Classification Search
CPC ....... A46B 7/08; A46B 13/008; A47L 11/14; A47L 11/16; A47L 11/162; A47L 11/164; A47L 11/283; A47L 11/4038
USPC ......... 15/49.1, 87, 98, 180, 230, 17, 230.19; 451/353, 359
See application file for complete search history.

(56) References Cited

U.S. PATENT DOCUMENTS 3,401,416 A * 9/1968 Ziegler ................. A47L 11/162
15/49.1
4,866,804 A * 9/1989 Masbruch ............. A47L 11/164
15/49.1
(Continued)

FOREIGN PATENT DOCUMENTS

DE 9110277 * 10/1991
DE 9302184 * 4/1993
(Continued)

OTHER PUBLICATIONS

International Search Report PCT/JP2013/063381 dated Aug. 2, 2013.
(Continued)

*Primary Examiner* — Mark Spisich
(74) *Attorney, Agent, or Firm* — Roberts Mlotkowski Safran Cole & Calderon P.C.

(57) ABSTRACT

To provide a cleaning device coupling instrument that can easily attach or detach a main body to or from a cleaning part in a cleaning device, and the cleaning device including the cleaning device coupling instrument.
A cleaning device coupling instrument 1 which can couple a main body in a cleaning device to a cleaning part to be fixed to the main body has: a first coupling member 10 including a bulging part 100 having a slant part the side peripheral part of which is tapered toward a tip thereof; and a second coupling member 20 including a fitted part 200 in which the bulging part 100 can be loosely fitted.

3 Claims, 21 Drawing Sheets

(51) Int. Cl.

| | | |
|---|---|---|
| *A47L 11/164* | (2006.01) | |
| *A47L 11/40* | (2006.01) | |
| *A46B 7/04* | (2006.01) | |
| *A46B 13/00* | (2006.01) | |
| *F16B 21/07* | (2006.01) | |
| *A46B 13/02* | (2006.01) | |
| *F16B 5/06* | (2006.01) | |
| *F16D 1/06* | (2006.01) | |

(52) U.S. Cl.
CPC ............... *A47L 11/14* (2013.01); *A47L 11/16* (2013.01); *A47L 11/4038* (2013.01); *A47L 11/4069* (2013.01); *F16B 21/071* (2013.01); *F16B 21/073* (2013.01); *F16B 5/065* (2013.01); *F16D 1/06* (2013.01); *Y10T 403/7039* (2015.01)

(56) References Cited

U.S. PATENT DOCUMENTS 5,421,053 A * 6/1995 Chodak ................ A47L 11/164
15/180
6,523,214 B1 * 2/2003 Kaiser ................ B24B 23/022
15/180
2008/0216259 A1 * 9/2008 Walz ................ A47L 11/4052
15/49.1

FOREIGN PATENT DOCUMENTS

| DE | 4215803 | * | 11/1993 |
|---|---|---|---|
| DE | 1950344 | * | 9/1996 |
| EP | 1279363 | | 1/2003 |
| GB | 2452090 | * | 2/2009 |
| JP | 1991-084062 A | | 8/1991 |
| JP | 07327897 | | 12/1995 |
| JP | 2001-017351 A | | 1/2001 |
| JP | 2002-065538 A | | 3/2002 |
| JP | 2004-113700 A | | 4/2004 |
| JP | 2006-150051 A | | 6/2006 |

OTHER PUBLICATIONS

Notice of Allowance dated Aug. 18, 2015 issued in corresponding JP Application 2012-111764 (JP Patent No. 6809104) and English translation thereof.

* cited by examiner

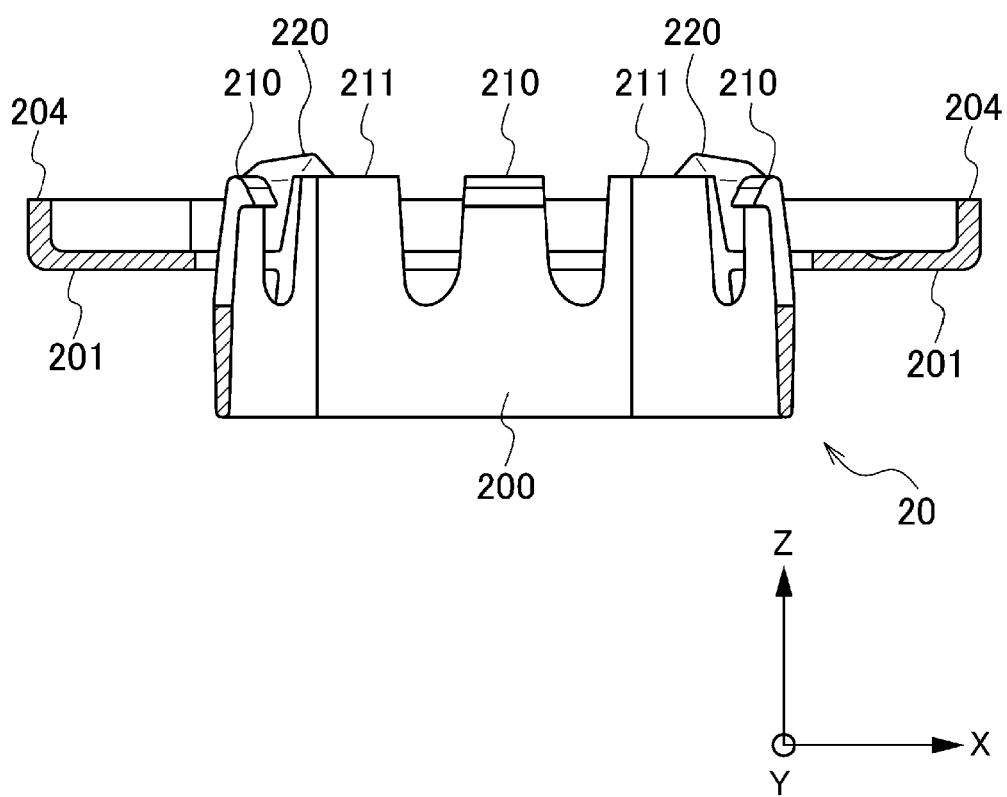

CLEANING DEVICE COUPLING INSTRUMENT AND CLEANING DEVICE

TECHNICAL FIELD

The present invention relates to a cleaning device coupling instrument and a cleaning device. In more detail, the present invention relates to a cleaning device coupling instrument used when a cleaning part is coupled to a main body of a cleaning device and a cleaning device having the cleaning device coupling instrument.

BACKGROUND ART

For example, in the case where a door knob is fixed to a door and where a cleaning part such as a brush and a pad is fixed to a main body of a cleaning device, a coupling instrument is conventionally used.

Of these, in particular, in the cleaning device, there is a case where only the cleaning part needs to be regularly replaced. For this reason, a coupling instrument has been used in which much ingenuity is exercised in attaching and detaching a main part to and from a cleaning part in the cleaning device.

As a specific example corresponding to this coupling instrument, in a Patent Document 1, is disclosed a cleaning member holder having a base plate shaped like a circular disc, a fixing plate detachably fixed to the bottom of the base plate, and a cleaning member fixing plate fixed to the bottom of the fixing plate. In this cleaning member holder, much ingenuity is exercised in that in the case where the cleaning member fixing plate is worn down, the whole holder does not need to be replaced but only the fixing plate and the cleaning member fixing plate are replaced, whereby the base plate can be repeatedly used.

Further, in a Patent Document 2, is disclosed a fixing device such as a brush for a cleaning device in which many protruding claws engaging with a cleaning body are formed in a protruding manner on a fixing face side of a holder plate. In this fixing device, much ingenuity is exercised in that a brush and a cleaning device can be coupled to each other by claws whose tips are directed in the rotational direction of the brush and a pad.

CITATION LIST

Patent Literatures

[Patent Document 1] JP-A No. 2006-150051
[Patent Document 2] JP-A No. 2004-113700

SUMMARY OF INVENTION

Technical Problem

However, in the related art described above, it cannot be yet said that a main body can be easily attached to and detached from a cleaning part such as a brush and a pad in the cleaning device. As a cleaning device is increased in size, an operation of attaching and detaching the main body to and from the cleaning part is more complicated for a user, so that it is desired by the user to facilitate the operation of attaching and detaching the main body to and from the cleaning part.

Hence, a main objective of the present invention is to provide a cleaning device coupling instrument that can easily attach and detach a main body to and from a cleaning part in a cleaning device and a cleaning device including the cleaning device coupling instrument.

Solution to Problem

The present invention provides a cleaning device coupling instrument of a coupling instrument that can couple a main body in a cleaning device to a cleaning part to be fixed to the main body, the cleaning device coupling instrument including: a first coupling member including a bulging part having a slant part the side peripheral part of which is tapered toward a tip thereof; and a second coupling member including a fitted part in which the bulging part can be loosely fitted.

Further, the second coupling member may have a plurality of engaging parts arranged around the fitted part, and the bulging part may have at least a single groove part, with which the engaging part can engage, provided around itself.

Still further, the bulging part may have a shape of a circular truncated cone, and the first coupling member may have a first protruding part formed in a protruding manner around the bulging part, and the second coupling member may have a second protruding part formed in a protruding manner around the opening part of the fitted part, the second protruding part being able to be adjacent to the first protruding part.

Still further, each of the first protruding part and the second protruding part has a face formed at a tip part thereof in a direction in which each of the first protruding part and the second protruding part is protruded, the face being slant in a direction in which the first coupling member and the second coupling member are rotated.

In addition, the engaging part may have a wall face part capable of facing a side peripheral part of the bulging part and a projecting part formed at a tip part thereof and capable of engaging with the groove part.

In this regard, the cleaning device described above includes, for example, a polisher, an automatic floor cleaning device, and a manual floor cleaning device. The main body includes, for example, a drive part and an operating part for transmitting power to the cleaning part.

Further, the cleaning part described above includes a brush, a pad, and a buff.

Further, the present invention provides also a cleaning device including the cleaning device coupling instrument described above.

Advantageous Effects of Invention

According to the present invention, the main body can be easily attached to and detached from the cleaning part in the cleaning device.

BRIEF DESCRIPTION OF DRAWINGS

FIG. 7C is a sectional view when viewed in the direction shown by arrows D-D in FIG. 7A.

DESCRIPTION OF EMBODIMENTS

Hereinafter, a mode for carrying out the present invention will be described in detail. In this regard, the present invention is not limited to an embodiment to be described below. Further, the description will be made in the following order.

1. Outline of coupling instrument 1
2. Construction of coupling instrument 1 and function thereof
   2-1. First coupling member 10
   2-2. Second coupling member 20
3. Method for fixing first coupling member to second coupling member 20

<1. Outline of Coupling Instrument 1>

Figure 1:
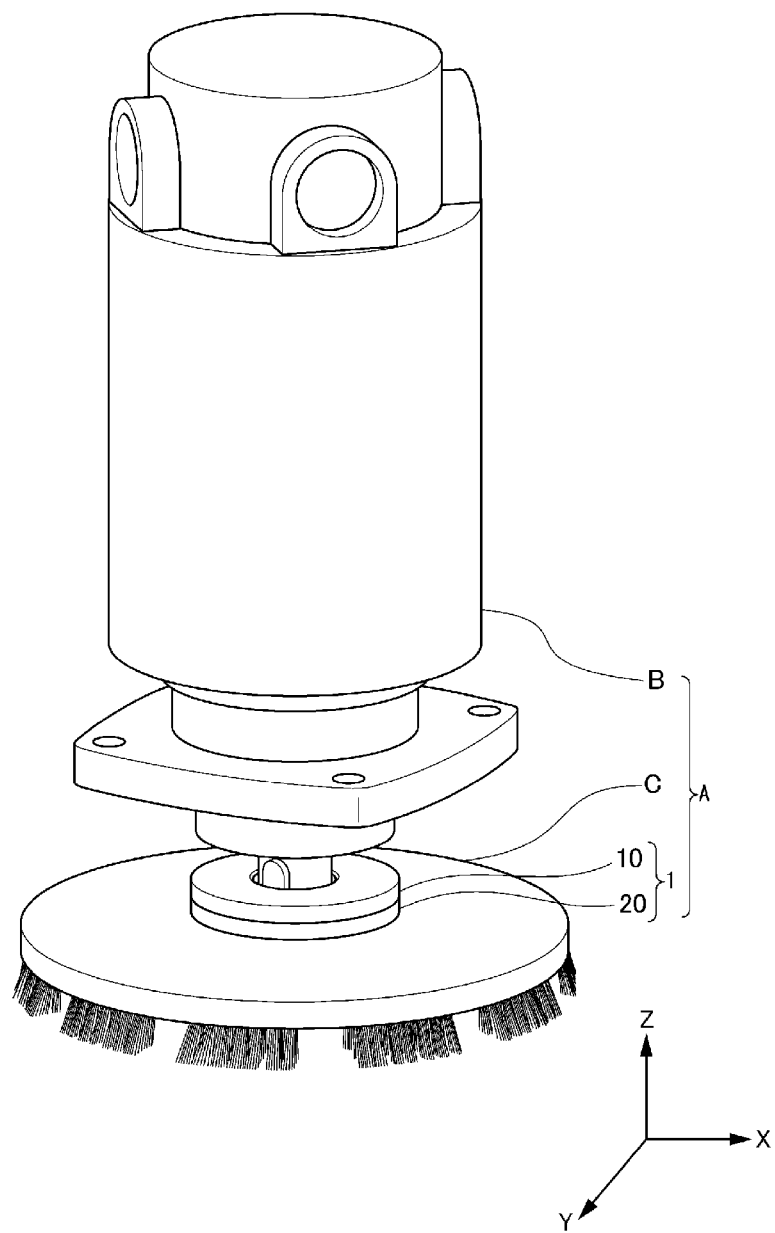
FIG. 1 is a perspective view of a cleaning device in which a coupling instrument according to an embodiment of the present invention is fixed to a main body and a cleaning part.

First, the outline of a coupling instrument 1 according to an embodiment of the present invention will be described with reference to FIG. 1 and FIG. 2. FIG. 1 is an illustration to show a cleaning device A in which a main body part B and a brush C are coupled to each other by a coupling instrument 1 according to the embodiment. Further, FIG. 2 is an exploded perspective view to illustrate the construction of the coupling instrument 1.

Figure 2:
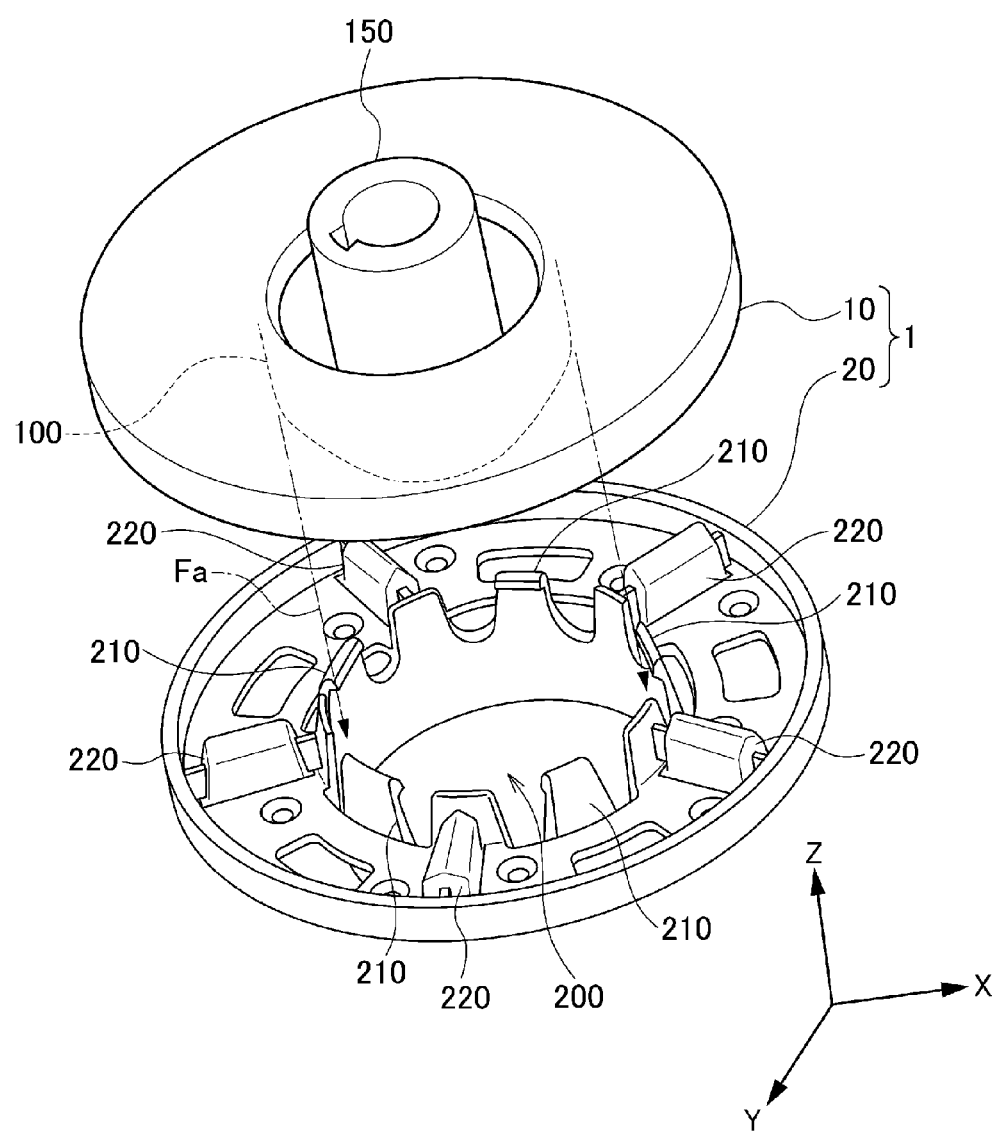
FIG. 2 is an exploded perspective view of the coupling instrument according to the embodiment.

In FIG. 1 and FIG. 2, a Z axis direction shows a direction in which a first coupling member 10 and a second coupling member 20, which construct the coupling instrument 1, are attached to and detached from each other. Further, in FIG. 1 and FIG. 2, an X axis direction and a Y axis direction show a direction perpendicular to the Z axis direction, respectively, and the X axis direction and the Y axis direction are orthogonal to each other. In this regard, also the X axis direction, the Y axis direction, and the Z axis direction in FIGS. 4A to 4C, FIGS. 5A to 5D, FIG. 6, FIGS. 7A to 7C, FIGS. 8A to 8C, and FIG. 9 to FIG. 12, which will be described later, are the same as the X axis direction, the Y axis direction, and the Z axis direction, which are shown in FIG. 1, so that their descriptions will be omitted in the following.

As shown in FIG. 1, the cleaning device A includes the main body B, the brush C that is to be fixed to the main body B, and the coupling instrument 1 for coupling the main body B to the brush C. The coupling instrument 1 mainly includes a first coupling member 10, which can be fixed to the main body B in the cleaning device A, and a second coupling member 20, which can be coupled to the first coupling member 10 and can have the brush C fixed to a face opposite to a coupling face thereof.

Further, as shown in FIG. 2, in the coupling instrument 1 according to the present embodiment, the first coupling member 10 can be moved in a direction shown by an arrow Fa and can have a bulging part 100 loosely fitted in a fitted part 200 of the second coupling member 20, whereby the first coupling member 10 and the second coupling member 20 can be attached to and detached from each other. For this reason, in the coupling instrument 1, the brush C can be attached to and detached from the main body B.

In this regard, the main body B described here includes a driving part for generating power in the cleaning device including a polisher, an automatic floor cleaning device, and a manual floor cleaning device and an operating part for operating the cleaning device by a user. In the coupling instrument 1, by coupling the main part B to the brush C and by driving the main body B, for example, the floor or the like can be cleaned while the brush C is rotated.

In this regard, the brush C is one example of a cleaning part, and a part which can be coupled to the main body B via the coupling instrument 1 is not limited to the brush C but, for example, a cleaning part such as a pad can be coupled to the main body B.

In this regard, a main body support part designated by a reference numeral 150, an engaging part designated by a reference numeral 210, and a second protruding part designated by a reference numeral 220, which are shown in FIG. 2, will be described later and hence their descriptions will be omitted here.

<2. Construction of Coupling Instrument 1 and Function Thereof>

Next, the construction of the first coupling member 10 and the second coupling member 20, which constructs the coupling instrument 1, and the function thereof will be described in more detail.

[2-1. First Coupling Member 10]

Figure 3:
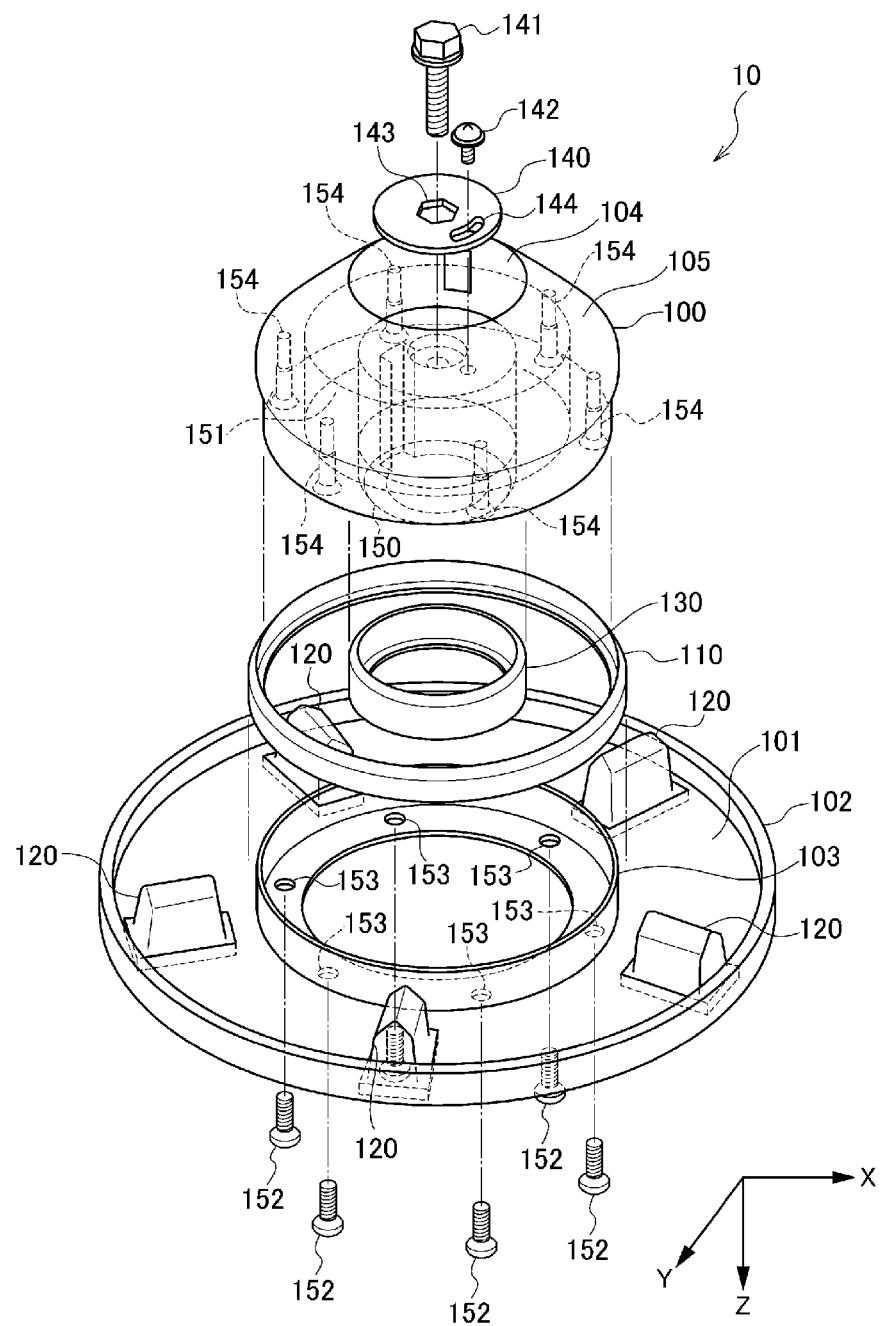
FIG. 3 is an exploded perspective view of a first coupling member constructing the coupling instrument according to the embodiment.
Figure 4A:
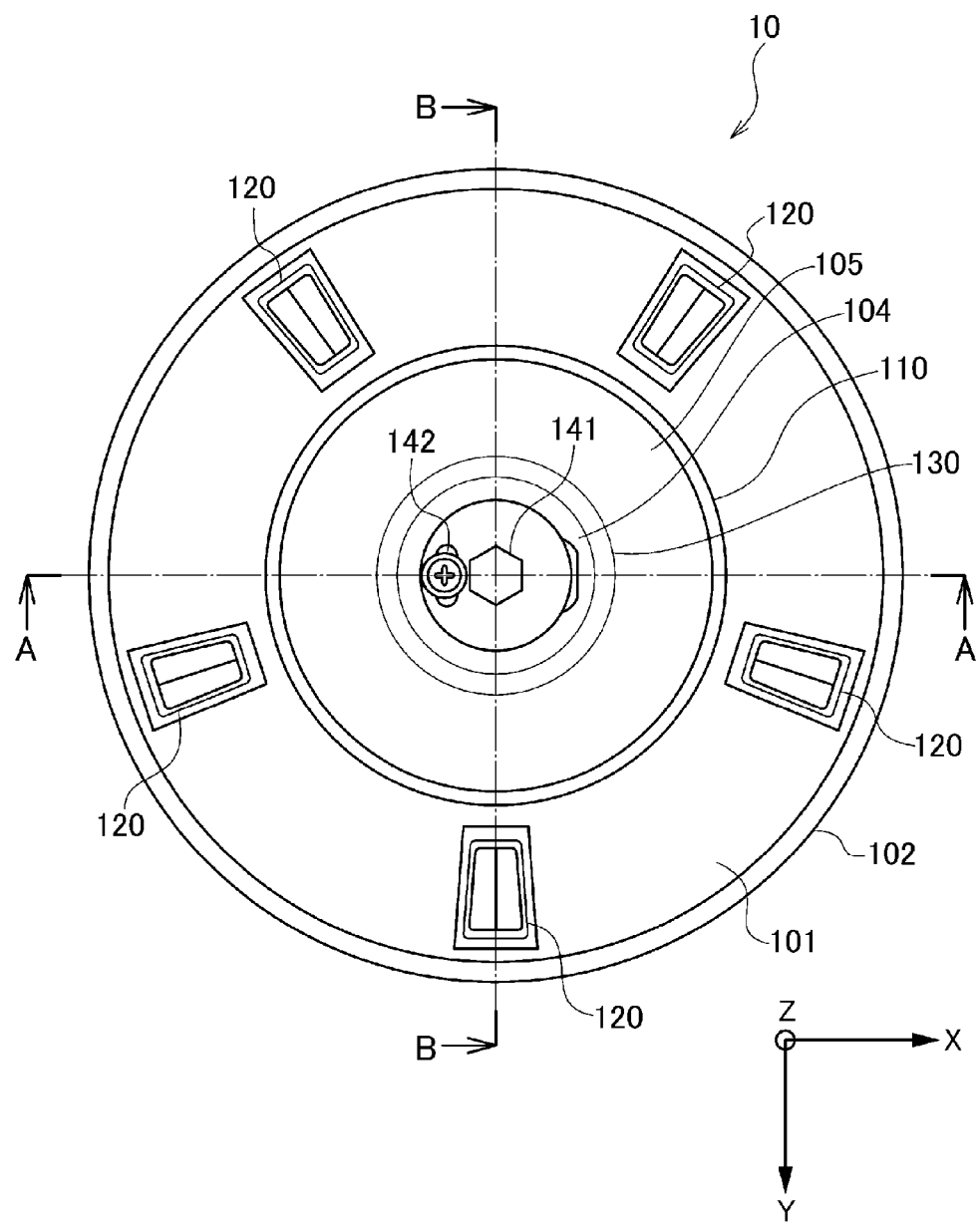
FIG. 4A is a plan view of the first coupling member constructing the coupling instrument according to the embodiment.
Figure 4B:
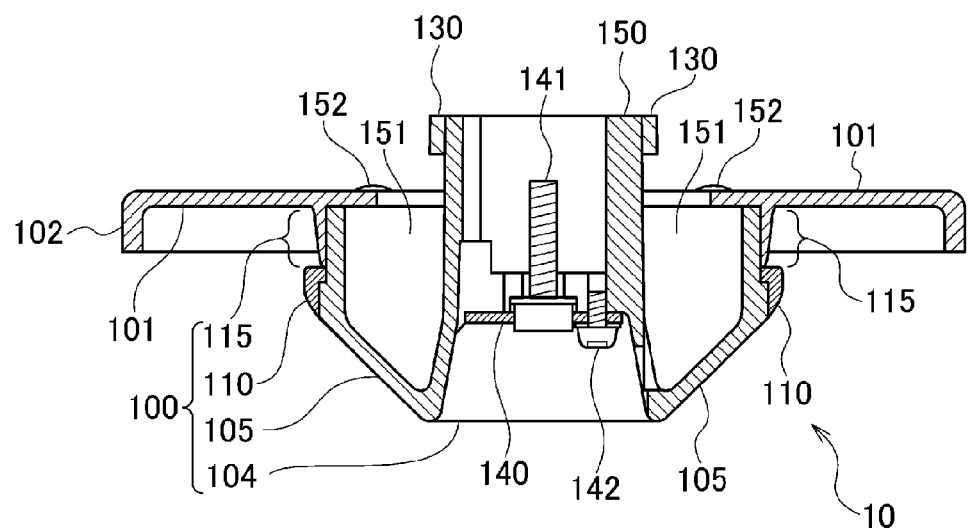
FIG. 4B is a sectional view when viewed in the direction shown by arrows A-A in FIG. 4A.
Figure 4B:
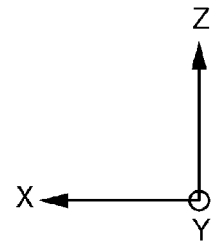
Figure 4C:
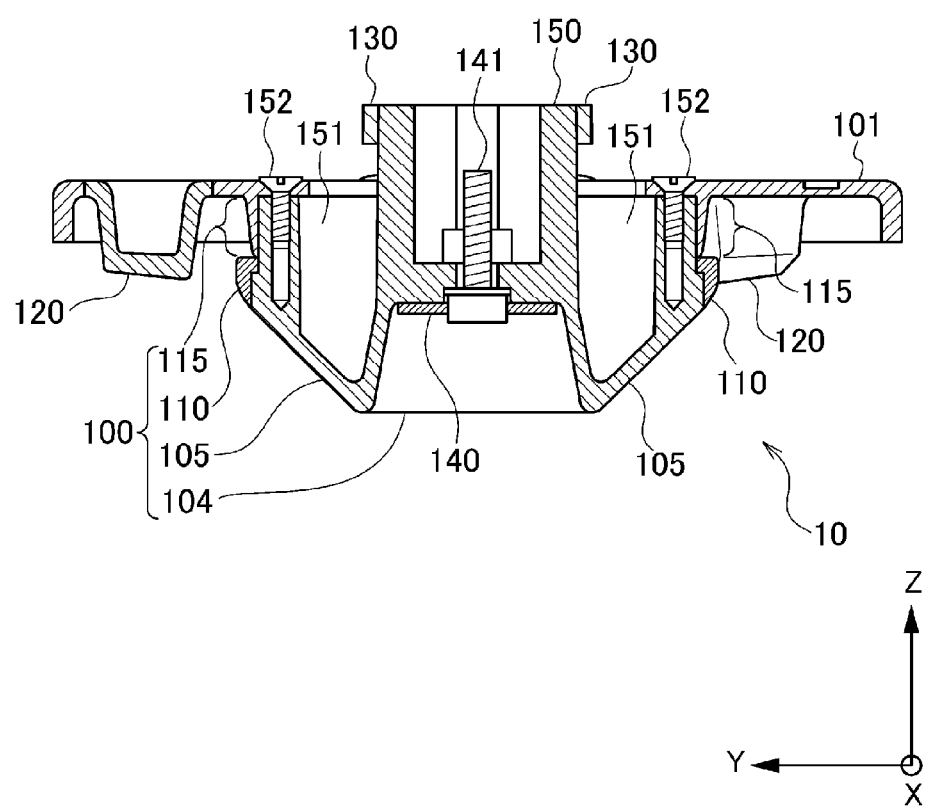
FIG. 4C is a sectional view when viewed in the direction shown by arrows B-B in FIG. 4A.

Here, the construction of the first coupling member 10 and the function thereof will be described mainly with reference to FIG. 3 and FIGS. 4A to 4C. FIG. 3 is an exploded perspective view to illustrate the construction of the first coupling member 10. Further, FIG. 4A is a plan view to illustrate the construction of the first coupling member 10. Further, FIG. 4B is a sectional view when viewed in the direction shown by arrows A-A in FIG. 4A and FIG. 4C is a sectional view when viewed in the direction shown by arrows B-B in FIG. 4A.

First, as shown in FIG. 3, the first coupling member 10 mainly includes a bulging part 100, which can be loosely fitted in the fitted part 200 of the second coupling member 20 described later, and a first base plate 101, which is shaped like a circular disk and can have the bulging part 100 fixed thereto. Further, the first base plate 101 has a plurality of first protruding parts 120 formed thereon in a protruding manner.

(2-1-1. Bulging Part 100)

The bulging part 100 has a slant part 105 in which a side peripheral portion thereof is tapered toward a tip end side. Specifically, as shown in FIGS. 4B and 4C, the bulging part 100 has an opening part 104 formed in a tip region thereof. Further, the bulging part 100 has the slant part 105 on the first base plate 101 side of the opening part 104. In other words, the bulging part 100 is formed in a truncated conical shape.

When the slant part 105 is brought into contact with the second coupling member 20 (again see FIG. 2), while the slant part 105 is sliding on the engaging parts 210 or the support part 211 of the fitted part 200 (again see FIG. 2), the bulging part 100 is being introduced into the fitted part 200. Further, in the coupling instrument 1, the first coupling member 10 can be moved on the second coupling member 20 with the opening part 104 being in contact with the second coupling member 20, which hence can prevent the first coupling member 10 from being unsteady when the first coupling member 10 is moved.

Further, as shown in FIG. 3, it is preferable that the bulging part 100 is formed in the shape of a circular truncated cone. If the bulging part 100 is formed in the shape of the circular truncated cone and the opening part of the fitted part 200 (again see FIG. 2) is a circular hole, when the bulging part 100 is fitted in the fitted part 200, it is not necessary to adjust the direction of the first coupling member 10 to the direction of the second coupling member 20. Further, even if the first coupling member 10 is coupled to the second coupling member 20, the first coupling member 10 can be rotated.

The material of the bulging part 100 is not limited to a special material but, in terms of durability, it is preferable that the bulging part 100 is constructed of aluminum, reinforced plastics, stainless steel, titan, or the like. In this regard, also the first base plate 101 described above may be constructed of the same material as the bulging part 100.

Further, as shown in FIG. 3, an engaged member 110 is fixed in the shape of a ring on the side circumferential portion of the bulging part 100. In this way, a single groove part 115 is formed between the engaged member 110 and the first base plate 101 (see FIGS. 4B and 4C). An engaging part 210 of the second coupling member 20, which will be described later, can be engaged in the groove part 115.

The material of the engaged member 110 forming the groove part 115 is not limited to a special material but, in order to stabilize a state in which the engaged member 110 engages with the engaging part 210, it is preferable that the material of the engaged member 110 is different in a surface energy from a material constructing the engaging part 210. Specifically, as the material of the engaged member 110 can be given, for example, fluorine-based resin, PEEK, nylon, and metal subjected to mirror finish processing.

(2-1-2. First Protruding Part 120)

As shown in FIG. 3, the first base plate 101 has a bulging part support part 103 provided in the central position thereof in such a way as to support the bulging part 100. Further, first protruding parts 120 are provided around the bulging part support part 103. That is, when the bulging part 100 is fixed to the first base plate 101, the first protruding parts 120 are arranged around the bulging part 100.

The first protruding part 120 can be adjacent to a second protruding part 220 constructing the second coupling member 20 which will be described later. For this reason, when the first coupling member 10 fixed to the main body B having the driving part is rotated, the second protruding part 220 is moved in conjunction with the first protruding part 120, whereby the second coupling member 20 is rotated. Hence, in the coupling instrument 1, the power driven by the main body B is transmitted to the brush C fixed to the second coupling member 20. In this way, the brush C can be rotated.

The number of the first protruding part 120 is not limited to a specified number, but it is preferable that a plurality of first protruding parts 120 is provided on the first base plate 101. When the plurality of first protruding parts 120 are provided, the space between the first protruding part 120 and the second protruding part 220 can be made narrow, whereby the first protruding part 120 is quickly made adjacent to the second protruding part 220 after the first coupling member 10 starts to be rotated. For this reason, the power described above can be transmitted to the second coupling member 20.

The constructions and the functions of parts designated by reference numerals 130, 140, 141, 142, 143, 144, 150, 151, 152, 153, and 154, which are shown in FIG. 3 and FIGS. 4A to 4C, will be described later and the construction of the first protruding part 120 will now be described in more detail with reference to FIGS. 5A to 5D. FIGS. 5A to 5D are illustrations to show the first protruding part 120 from different directions and show only portions necessary for describing the first protruding part 120 of the first coupling member 10.

Figure 5A:
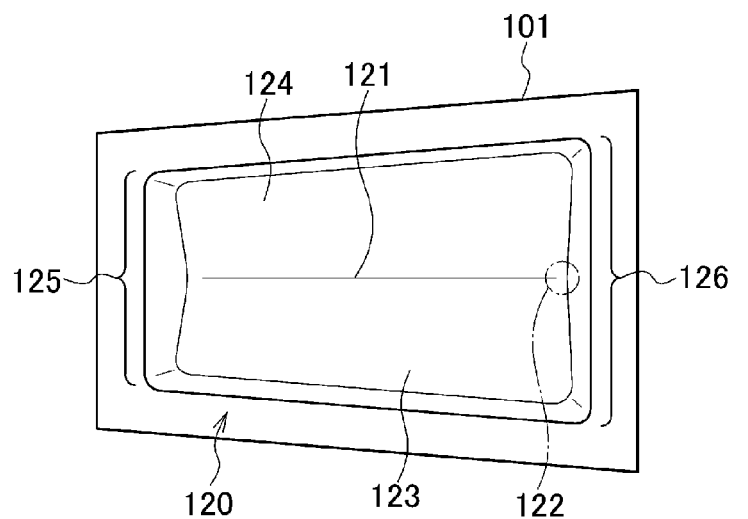
FIG. 5A is a plan view to show a first protruding part constructing the coupling instrument according to the embodiment.
Figure 5A:
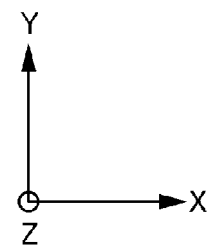
Figure 5B:
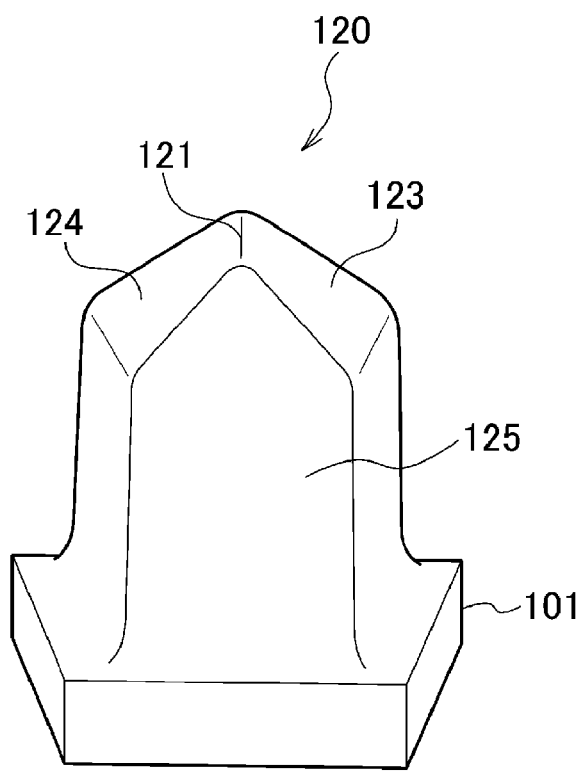
FIG. 5B is a right side view to show the first protruding part constructing the coupling instrument according to the embodiment.
Figure 5B:
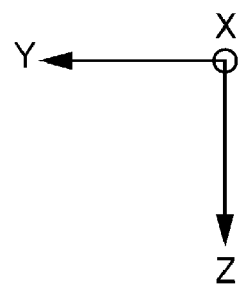
Figure 5C:
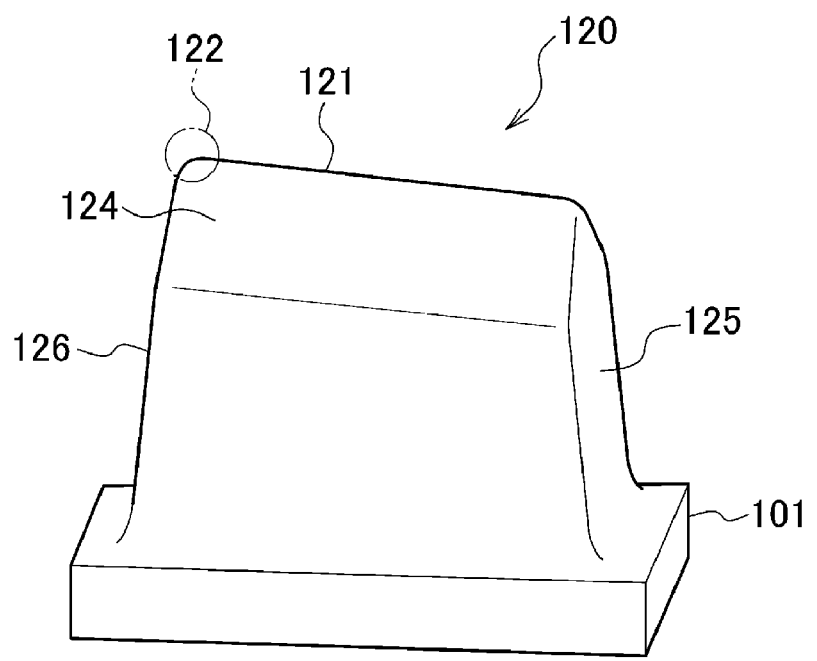
FIG. 5C is a front view to show the first protruding part constructing the coupling instrument according to the embodiment.
Figure 5C:
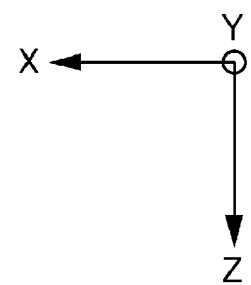
Figure 5D:
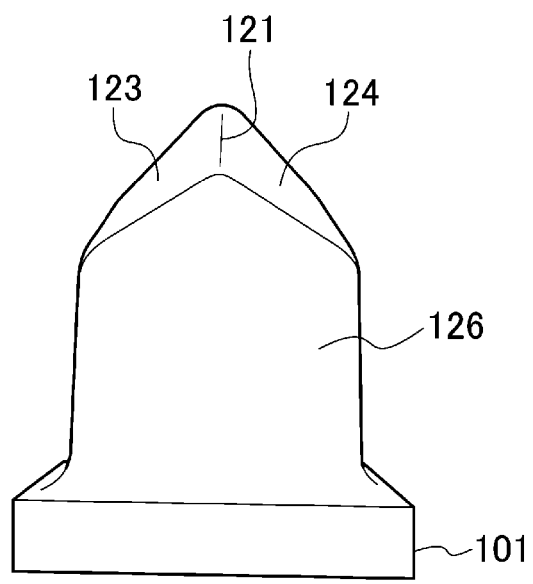
FIG. 5D is a left side view to show the first protruding part constructing the coupling instrument according to the embodiment.
Figure 5D:
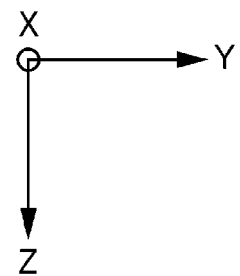

The first protruding part 120 shown in FIGS. 5A to 5D is formed on the first base plate 101 (again see FIG. 3) in a protruding manner in a direction in which the bulging part 100 is formed. Further, as shown in FIGS. 5B and 5D, each of the side face parts 125, 126 of the first protruding part 120 has a nearly pentagonal shape when viewed in a side view.

Further, the first protruding part 120 has a tip part 121 formed in an extending manner at a tip position in a direction in which the first protruding part 120 is formed in the protruding manner. The tip part 121 has a peak part 122 formed at an end on the side face part 126 side. Further, as shown in FIG. 5C, the first protruding part 120 is formed in such a way that the tip part 121 has its height decreased toward the side face part 125 side from the side face part 126 side. In other words, in the first protruding part 120, the peak part 122 is located at the forefront on the plus side in the Z axis direction.

Further, the first protruding part 120 has slant face parts 123, 124, on which a peak part 222 of the second protruding part 220 described above can move in a sliding manner, formed thereon in a direction in which the first protruding part 120 is rotated (in a minus direction of the Y axis and in a plus direction of the Y axis) with respect to the tip part 121.

Further, although it will be described later, the second coupling member 20 has the second protruding part 220 formed in a protruding manner in a direction opposite to the first protruding part 120 (on the plus side in the Z axis direction), the second protruding part 220 being in the substantially same shape as the first protruding part 120.

The first protruding part 120 and the second protruding part 220 are formed in these shapes, so that even if the tip parts of the first protruding part 120 and the second protruding part 220 are brought into contact with each other, they are not brought into surface contact with each other but the peak part 122 of the first protruding part 120 and the peak part 222 of the second protruding part 220 are brought into point contact with each other or abutted against each other at a point. For this reason, the contact state thereof is eliminated by the self weight of the first coupling member 10 without a special force. In this regard, the phenomenon in which the first protruding part 120 and the second protruding part 220 are abutted against each other will be described later with reference to FIG. 10 and FIG. 11.

(2-1-3. Other Constructions)

Let's again refer to FIG. 3 and FIGS. 4A to 4C. As shown in FIG. 3, in the first coupling member 10, the first base plate 101 has a frame part 102 formed on the outer periphery thereof. Further, the bulging part 100 has a cylindrical main body support part 150 formed in a protruding manner in a direction opposite to a direction in which the slant part 105 of the bulging part 100 is tapered, the cylindrical main body support part 150 being capable of supporting the main body B. The bulging part 100 has a main body fitting hole 151 formed on the outer periphery of the main body support part 150, the main body fitting hole 151 having the main support part 150 fitted therein.

Further, the main body support part 150 is fixed with a reinforcing member 130 for inhibiting the main body support part 150 from deteriorating with time.

Still further, the opening part 104 (see FIGS. 4B and 4C) of the bulging part 100 has an opening shape and has a screw fixing member 140 fixed in the hole of the opening part 104 (see FIG. 3). The screw fixing member 140 can have through holes 143, 144 so as to fix a screw 141 and a screw 142.

The coupling of the first base plate 101 to the bulging part 100 is not limited to a special coupling. For example, the first base plate 101 is coupled to the bulging part 100 by inserting a plurality of screws 152 into the through holes 153 formed in the bulging part support part 103 and threaded holes 154 formed around the main body fixing hole 151.

[2-2. Second Coupling Member 20]

Figure 6:
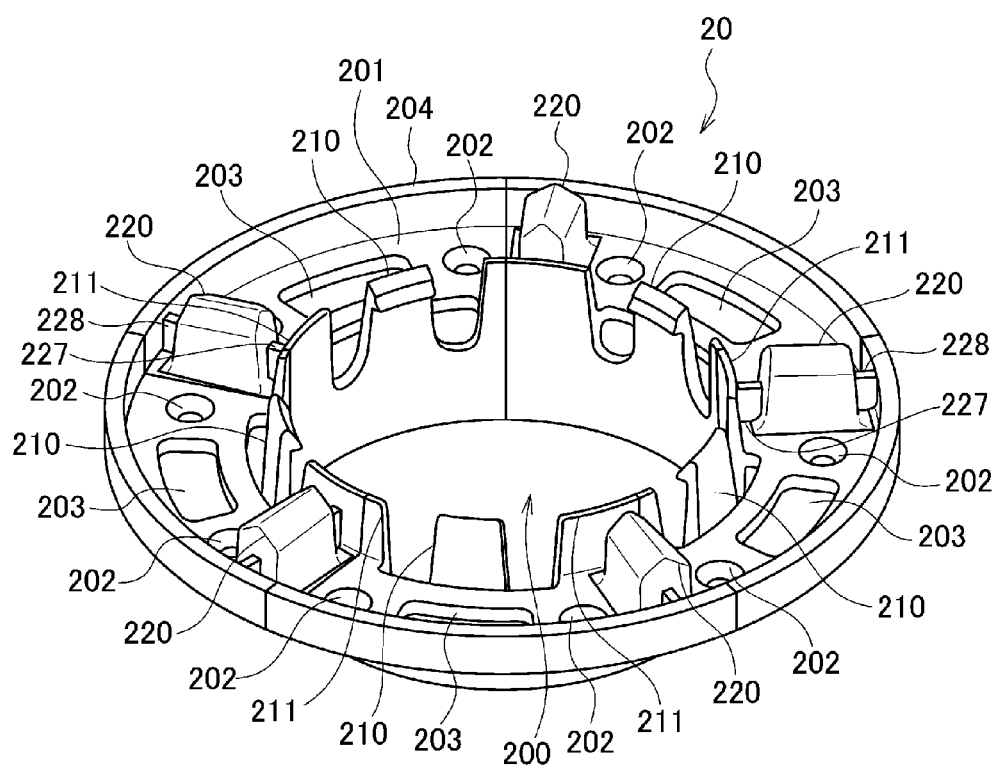
FIG. 6 is a perspective view of a second coupling member constructing the coupling instrument according to the embodiment.
Figure 6:
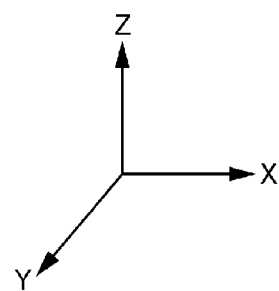
Figure 7A:
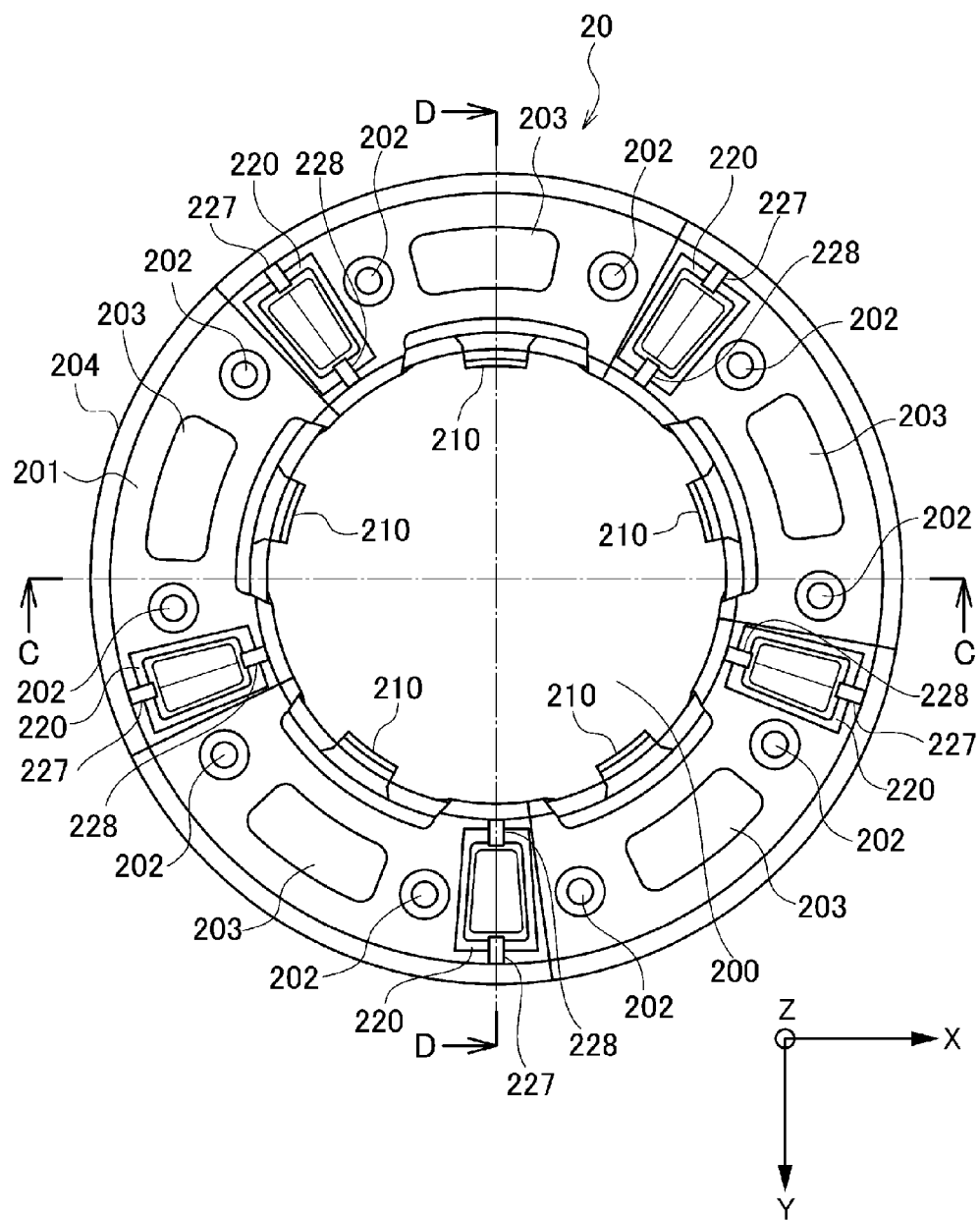
FIG. 7A is a plan view of the second coupling member constructing the coupling instrument according to the embodiment.
Figure 7B:
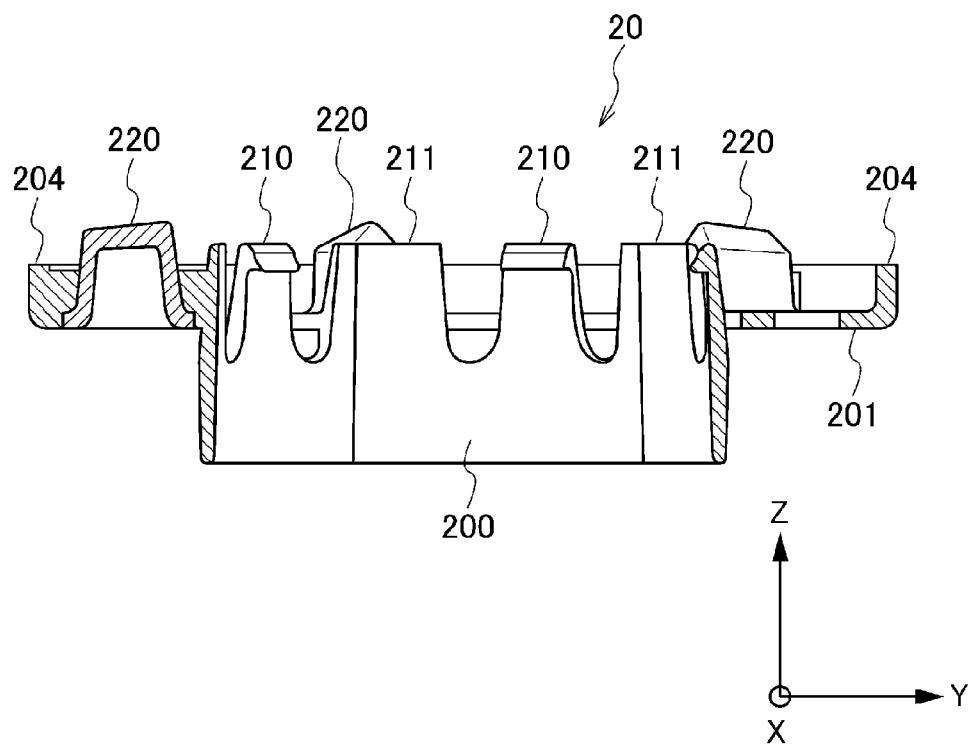
FIG. 7B is a sectional view when viewed in the direction shown by arrows C-C in FIG. 7A.

Next, here, the construction and the function of the second coupling member 20 will be described with reference to FIG. 6 and FIGS. 7A to 7C. FIG. 6 is a perspective view to illustrate the construction of the second coupling member 20. Further, FIG. 7A is a plan view to illustrate the construction of the second coupling member 20. Still further, FIG. 7B is a sectional view when viewed in a direction shown by arrows C-C in FIG. 7A and FIG. 7C is a sectional view when viewed in a direction shown by arrows D-D in FIG. 7A.

First, as shown in FIG. 6, in the second coupling member 20, the bulging part 100 of the first coupling member 10 described above can be loosely fitted in a fitted part 200. The second coupling member 20 mainly includes a second base plate 201 and the fitted part 200 formed in the central portion of the second base plate 201 formed in the shape of a ring. Further, the second base plate 201 has a plurality of engaging parts 210 arranged in the periphery of the fitted part 200. In addition, the fitted part 200 has second protruding parts 220 formed in a protruding manner around the fitted part 200.

(2-2-1. Fitted Part 200)

If the fitted part 200 can have the bulging part 100 loosely fitted thereto, the fitted part 200 is not limited to a special shape but can be formed, for example, in a through hole made in the Z axis direction (see FIG. 7A and the like). Further, as described above, the bulging part 100 is formed in the shape of a circular truncated cone, so that the opening part of the fitted part 200 is formed in a circular shape so as to correspond to the shape of the bulging part 100. In this way, the first coupling member 10 can be rotated in a state where the bulging part 100 is fitted in the fitted part 200.

(2-2-2. Engaging Part 210)

As shown in FIG. 6, the engaging part 210 can engage with the groove part 115 of the first coupling member 10 described above (again see FIGS. 4B and 4C). When the engaging part 210 engages with the groove part 115, the coupling state of the first coupling member 10 and the second coupling member 20 can be stably held.

The material of the engaging part 210 is not limited to a special material but, in order to stabilize the state where the engaging part 210 engages with the groove part 115, it is preferable that the material of the engaging part 210 is different in the surface energy from a material constructing the groove part 115 (that is, the material of the engaged member 110 (again see FIG. 4)).

Further, it is preferable that the engaging part 210 has flexibility. When the engaging part 210 has the flexibility, the engaging part 210 is bent by an external force to eliminate the coupling state of the first coupling member 10 and the second coupling member 20 (force to remove the first coupling member 10 from the second coupling part 20), whereby a state where the engaging part 210 engages with the groove part 115 is released. In this way, the first coupling member 10 is removed from the second coupling member 20.

Specifically, as the material of the engaging part 210 can be given, for example, PEEK, nylon, POM, resin such as ABS, and metal such as stainless steel. Further, also the second base plate 201 may be constructed of the same material as the engaging part 210. In this regard, the material of the engaging part 210 will be described later with reference to FIG. 8C.

Further, as shown in FIG. 6, the second coupling member 20 has a plurality of support parts 211 erected thereon in such a way as to be adjacent to the engaging part 210 in the direction in which the first coupling member 10 and the second coupling part 20 are rotated. Although not limited to, the engaging parts 210 and the support parts 211 are alternately arranged around the opening part of the fitted part 200.

Figure 8A:
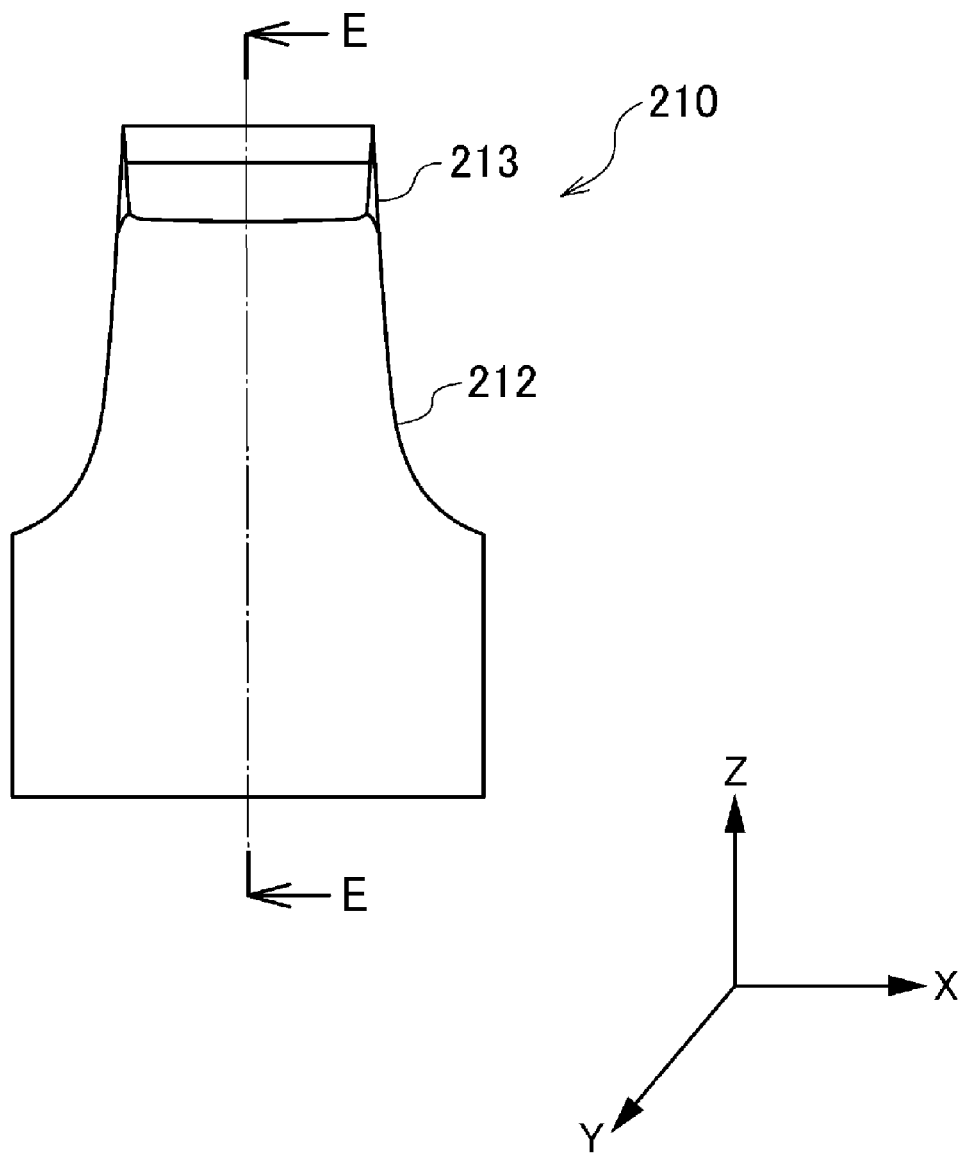
FIG. 8A is a front view to show an engaging part constructing the coupling instrument according to the embodiment.
Figure 8B:
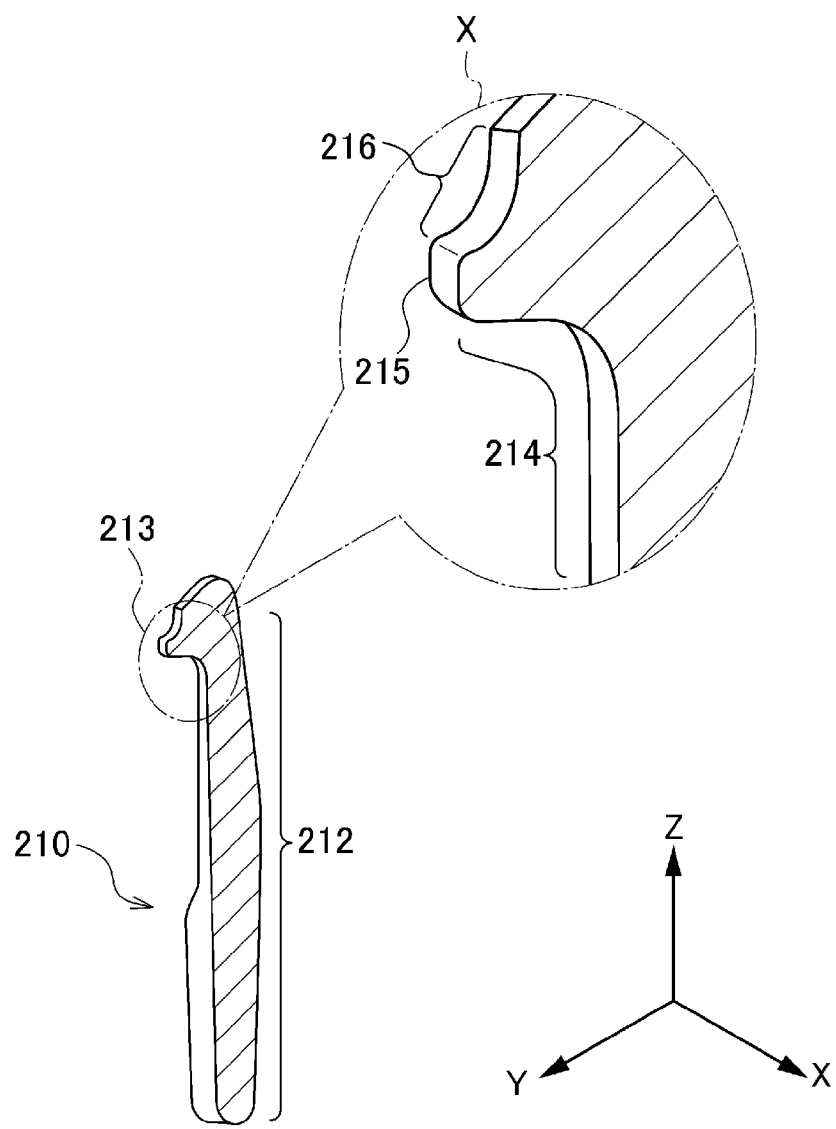
FIG. 8B is a sectional view when viewed in the direction shown by arrows E-E in FIG. 8A.
Figure 8C:
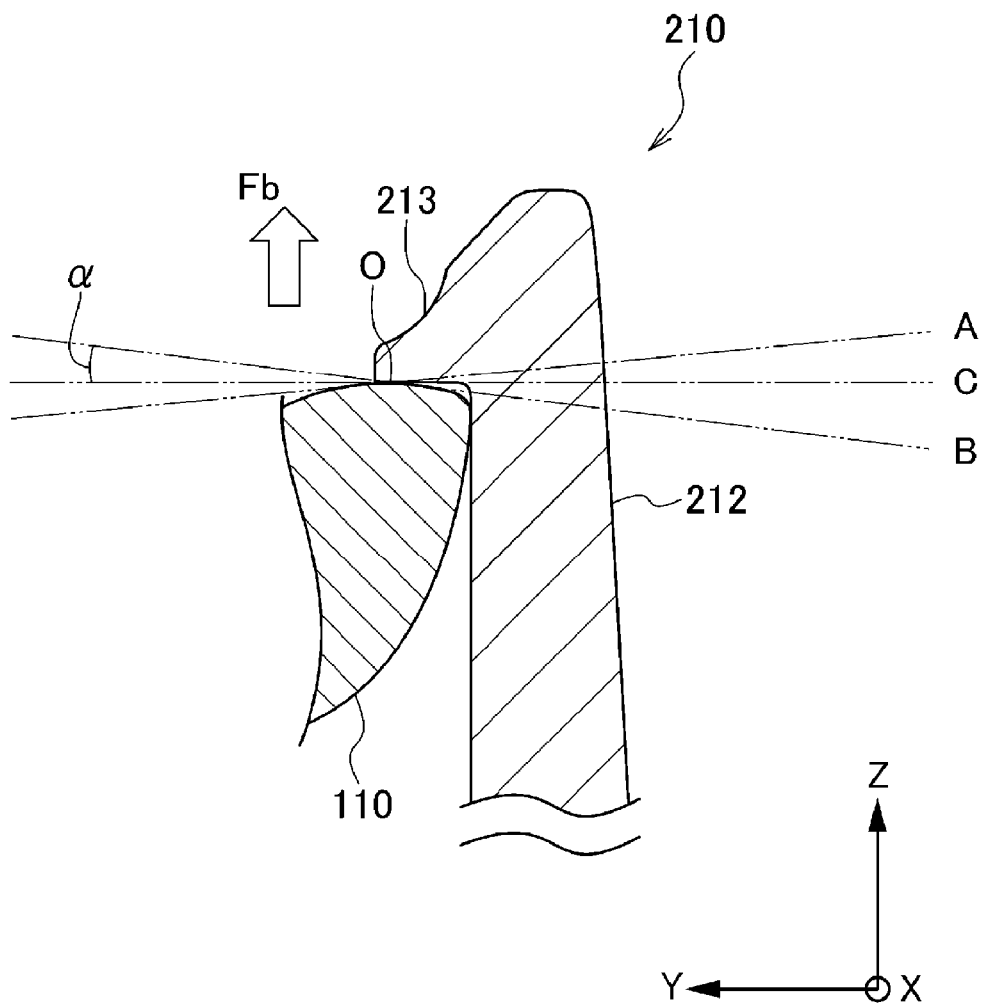
FIG. 8C is an illustration to show an engaging state of an engaging part 210 constructing the coupling instrument according to the embodiment.
Figure 9:
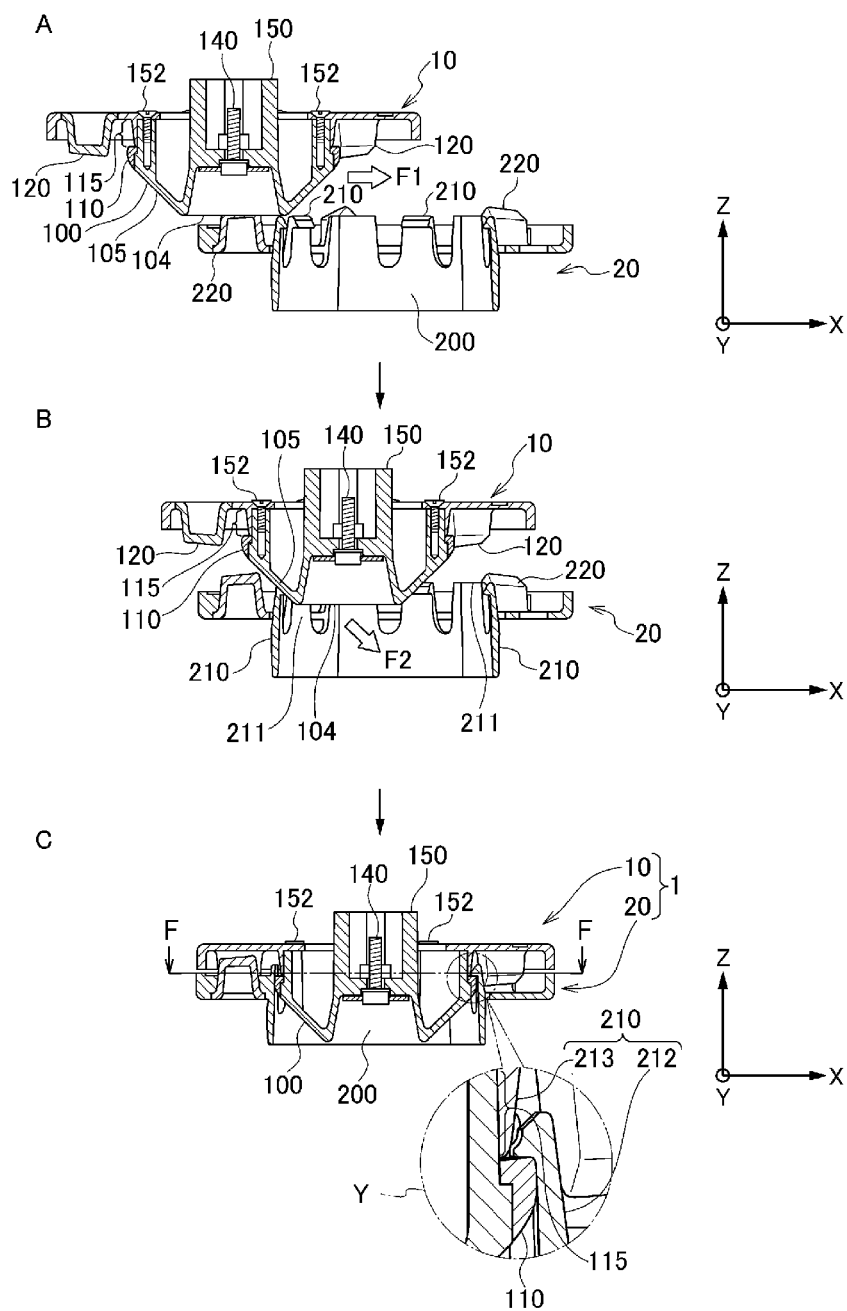
FIGS. 9A, 9B, and 9C are illustrations to show a method for fixing a first coupling member and a second coupling member, which construct the coupling instrument according to the embodiment, to each other.

The constructions and the functions of parts designated by reference numerals 202, 203, 204, 220, 227, and 228, which are shown in FIG. 6 and FIGS. 7A to 7C, will be described later and the construction of the engaging part 210 will now be described in more detail with reference to FIGS. 8A to 8C. FIG. 8A is an illustration to describe the construction of the engaging part 210 and shows only portions necessary for describing the engaging part 210 of the second coupling member 20. Further, FIG. 8B is a sectional view when viewed in the direction shown by arrows E-E shown in FIG. 8A. Still further, FIG. 8C is an illustration to show a state where the engaging part 210 engages with the engaged member 110.

The engaging part 210 shown in FIG. 8B is erected on the second base plate 201. The engaging part 210 has a wall face part 212, which can face a side circumferential portion of the bulging part 100 (again see FIG. 3), and a projecting part 213, which is formed at a top end (tip end in the plus direction of the Z axis) of the engaging part 210 and can engage with the groove part 115. The projecting part 213 is tapered toward the fitted part 200 side. The engaging parts 210 are provided plurally around the fitted part 200 and the wall face parts 212 face the bulging part 100, respectively.

In FIG. 8B is shown also an enlarged view of the projecting part 213 (refer to a reference character X). The projecting part 213 has a region 214 formed at a tip end in a direction in which the engaging part 210 is erected, a tip part 215 located at the tip of the region 214, and a curved face 216 formed curvedly in the direction in which the engaging part 210 is erected with respect to the tip part 215.

The region 214 is brought into contact with the engaged member 110 (again see FIG. 4) forming the groove part 115 described above. The shape of the region 214 can be set appropriately according to the shape of the engaged member 110. For example, the region 214 can be formed in a shape curved toward the tip part 215 side, that is, from a direction in which the engaging part 210 is erected to a direction perpendicular to the direction.

Further, also the shape of the curved face 216 can be appropriately set according to the material or the like of the engaged member 110. For example, the curved face 216 can be formed in a shape gently curved toward the tip part 215 side, that is, from a direction in which the engaging part 210 is erected to a direction perpendicular to the direction.

In FIG. 8C is shown a state where the first coupling member 10 and the second coupling member 20 are coupled to each other and where the engaging part 210 engages with the engaged member 110 forming the groove part 115. At this time, the projecting part 213 is in contact with the engaged member 110 at a contact point O and a tangent at the contact point O of the engaged member 110 is a line A. In contrast to this, when the second coupling member 20 is removed from the first coupling member 10, the first coupling member 10 has a force applied thereto in a direction shown by an arrow Fb, so that the first coupling member 10 is moved in a direction shown by the arrow Fb. In this way, the engaging part 210 engaging with the engaged member 110 is bent. Then, a tangent formed at the contact point O of the engaged member 110 is changed from the line A to a line B.

Here, in the case where a frictional force between the projecting part 213 and the engaged member 110 becomes a maximum static frictional force when a tilt angle of the line B with respect to a horizontal line C is a, the first coupling member 10 has a force further applied thereto in the direction shown by the arrow Fb and the projecting part 213 slides on the engaged member 110, whereby an engaging state where the projecting part 213 engages with the engaged member 110 is released. It is preferable that the material or the like of the engaging part 210 is selected in such a way that when this engaging state is released, the engaging part 210 is bent within a resilient limit. In this way, even if the first coupling member 10 and the second coupling member 20 are attached to and detached from each other at a plurality of times, the engaging part 210 can be prevented from being broken.

(2-2-3. Second Protruding Part 220)

Again let's refer to FIG. 6 and FIGS. 7A to 7C. As shown in FIG. 6, the fitted part 200 has the second protruding parts 220 provided around the opening part thereof. Since the second protruding parts 220 are adjacent to the first protruding parts 120, when first coupling member 10 is rotated, the second coupling member 20 can be rotated.

The detailed construction of the second protruding part 220 is substantially equal to the construction of the first protruding part 120 except that the second protruding part 220 is formed on the second base plate 201 in a protruding manner in a direction opposite to the first protruding part 120 described above (again see FIGS. 5A to 5D).

As described above when the construction and the function of the first protruding part 120 have been described, when the first coupling member 10 and the second coupling part 20 are coupled to each other, even if the tip parts of the first protruding part 120 and the second protruding part 220 are brought into contact with each other, they are not brought into surface contact with each other but they are brought into point contact with each other. For this reason, the contact state thereof is eliminated by the self weight of the first coupling member 10 without a special force.

(2-2-4. Other Constructions)

As shown in FIG. 6, the second base plate 201 has a frame-shaped part 204 provided on the outer circumference thereof. A support part 228 is provided between the second protruding part 220 and the frame-shaped part 204 and a support part 227 is provided between the second protruding part 220 and the support part 211.

Further, as shown in FIG. 6 and FIG. 7A, through holes 202, which are made through in a direction in which the engaging parts 210 of the second coupling member 20 are erected, are formed around the fitted part 200. When the screws (not shown in the drawing) are inserted into the through holes 202, the brush C is fixed to the second coupling member 20. Further, in order to further stabilize the state in which the brush C is fixed to the second coupling member 20, holes 203 are formed between the adjacent through holes 202.

[3. Method for Fixing First Coupling Member 10 to Second Coupling Member 20]

Next, a method for fixing the first coupling member 10 to the second coupling member 20 in the coupling instrument 1 according to the present embodiment will be described mainly with reference to FIGS. 9A to 9C. FIGS. 9A to 9C are illustrations to show the method for fixing the first coupling member 10 to the second coupling member 20. In this regard, the description of the method will be made here in a state where only the first coupling member 10 and the second coupling member 20 are shown in the drawings and where the main body B to be attached to the first coupling member 10 and the brush C to be attached to the second coupling member 20 are not shown in the drawings.

Here, the description will be made from a state where the first coupling member 10 is arranged near the opening part of the fitted part 200 of the second coupling member 20 (see FIG. 9A). First, an operator drives the main body B in the cleaning device (for example, the operator moves the first coupling member 10 by an operating part such as a handle), thereby sliding the bulging part 100 to the fitted part 200 side in a state where the bulging part 100 is in contact with the second coupling member 20 (see an arrow F1). Since the bulging part 100 is formed in the shape of the circular truncated cone, the operator can move the first coupling member 10 while preventing the first coupling member 10 from becoming unsteady.

Next, the operator moves the bulging part 100 to a state where the opening part 104 is positioned above the fitted part 200 and where the slant part 105 is brought into contact with the engaging part 210 or the support part 211 (outer edge of the fitted part 200). In this way, the bulging part 100 can be slid into the fitted part 200 with the slant part 105 being in contact with the engaging part 210 or the support part 211 (see an arrow F2 in FIG. 9B).

Next, the bulging part 100 is introduced into the fitted part 200 and is fitted in the fitted part 200. In this way, the first coupling member 10 is coupled to the second coupling member 20 (see FIG. 9C). In this way, in the coupling instrument 1 according to the present embodiment, the first coupling member 10 and the second coupling member 20 can be easily coupled to each without a complicated operation or the like.

At this time, as shown by an enlarged view Y in FIG. 9C, the engaging part 210 engages with the groove part 115 (the projecting part 213 abuts on the engaged member 110), so that a stable coupling state between the first coupling member 10 and the second coupling member 20 can be held. On the other hand, the engaging part 210 is bent by an external force applied by the operator for releasing the coupling state between the first coupling member 10 and the second coupling member 20 (force for removing the first coupling member 10 from the second coupling member 20), whereby the state where the engaging part 210 engages with the groove part 115 is released. In this way, the first coupling member 10 is removed from the second coupling member 20.

Figure 10:
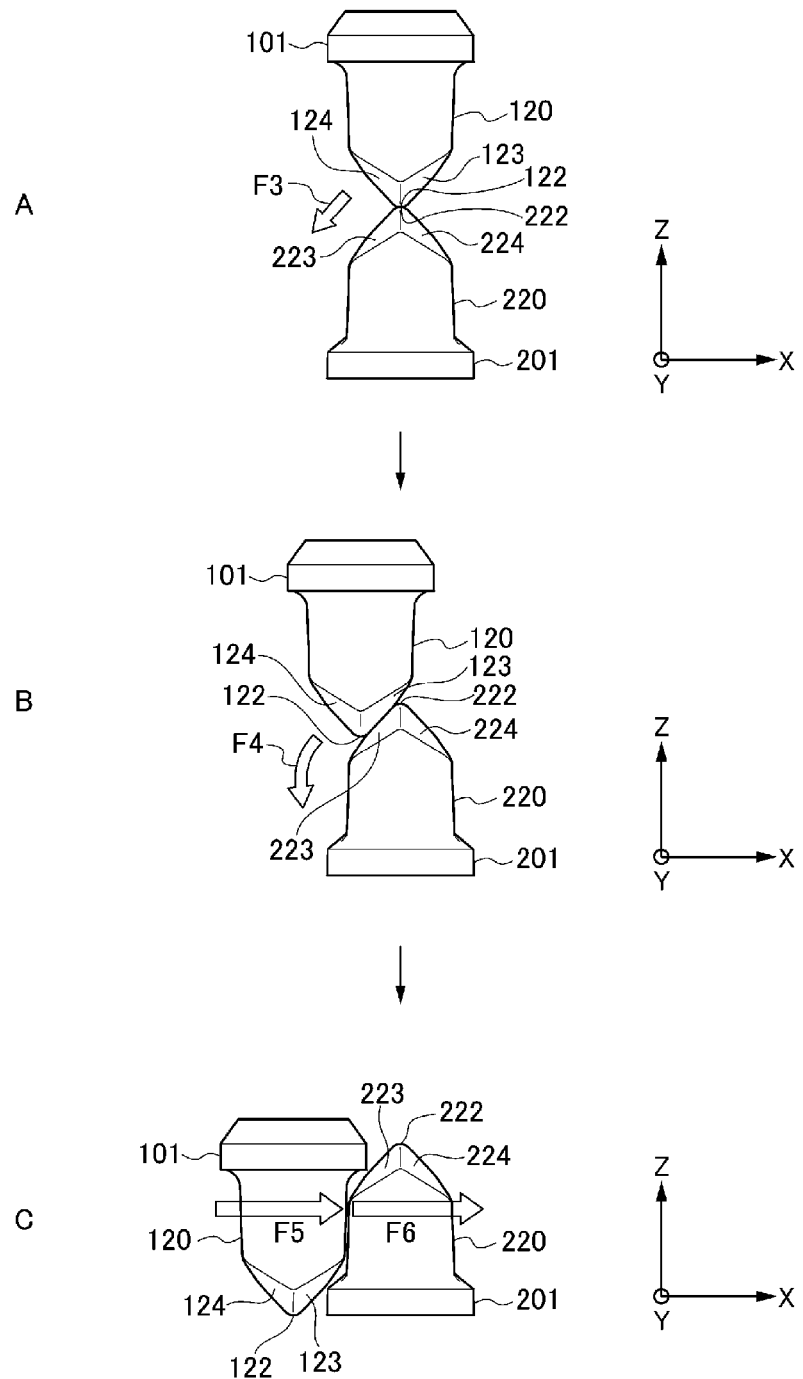
FIGS. 10A, 10B, and 10C are illustrations to show a state in which a first protruding part and a second protruding part are brought into contact with each other when the first coupling member and the second coupling member, which construct the coupling instrument according to the embodiment, are fixed to each other.

Here, in a state shown in FIG. 9B and a state shown in FIG. 9C, a situation in which the first protruding part 120 is brought into contact with the second protruding part 220 can be caused, so this situation will be described with reference to FIG. 10 (see also FIG. 4A and FIG. 7A). FIGS. 10A to 10C are illustrations to show a state where when the first coupling member 10 is fixed to the second coupling member 20, the first protruding part 120 is brought into contact with the second protruding part 220.

Figure 11:
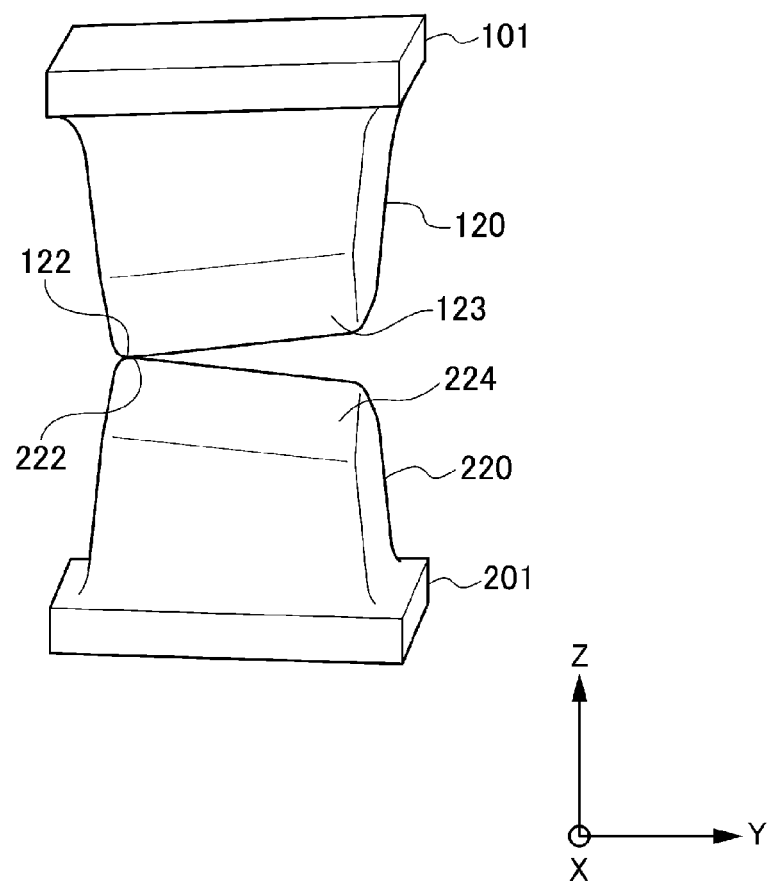
FIG. 11 is an illustration to show a state in which the first protruding part and the second protruding part, which construct the coupling instrument according to the embodiment, are brought into contact with each other.

As shown in FIG. 10A, there is a case where the first protruding part 120 and the second protruding part 220 are brought into contact with each other with their peak parts 122, 222 abutting against each other. As for the state where their peak parts 122, 222 abut against each other, let's refer to also FIG. 11. FIG. 11 is an illustration to show the state where the first protruding part 120 and the second protruding part 220 abut against each other. The first protruding part 120 and the second protruding part 220 are not brought into surface contact with each other but have their peak parts 122, 222 brought into point contact with each other, so that the states shown in FIG. 10A and FIG. 11 result in unstable states. In this case, the first protruding part 120 is moved by the self weight of the first coupling member 10 in a sliding manner on a slant face 223 (or a slant face 224) formed on the second protruding part 220 (see an arrow F3 in FIG. 10A).

Next, the first protruding part 120 is moved in the sliding manner on the slant face part 223 with the slant face part 123 and the slant face part 223 being in contact with each other, which results in a state where the slant face part 123 and the slant face part 223 are not in contact with each other. In this way, the first protruding part 120 is moved to the base plate 201 side of the second coupling member 20 (to the minus side of the Z axis direction) by the self weight of the first coupling member 10 (see an arrow F4 in FIG. 10B).

Then, the first protruding part 120 and the second protruding part 220 are arranged in such a way as to be adjacent to each other (see FIG. 10C). At this time, the coupling of the first coupling member 10 and the second coupling member 20 is completed (again see FIG. 9C).

In this way, in the coupling instrument 1, even if the first protruding part 120 and the second protruding part 220 abut against each other, they are not brought into surface contact with each other but have the peak part 122 and the peak part 222 brought into point contact with each other. For this reason, this contact state is eliminated by the self weight of the first coupling member 10.

Further, as shown in FIG. 10C, the first protruding part 120 and the second protruding part 220 are brought into contact with each other, so that when the first coupling member 10 fixed to the main body B having the drive part is rotated, the second protruding part 220 is moved in conjunction with the first protruding part 120, whereby the second coupling member 20 is rotated (see arrows F5 and F6 in FIG. 10C). Hence, in the coupling instrument 1, the power driven by the main body B is transmitted to the brush C fixed to the second coupling member 20, whereby the brush C can be rotated.

Figure 12:
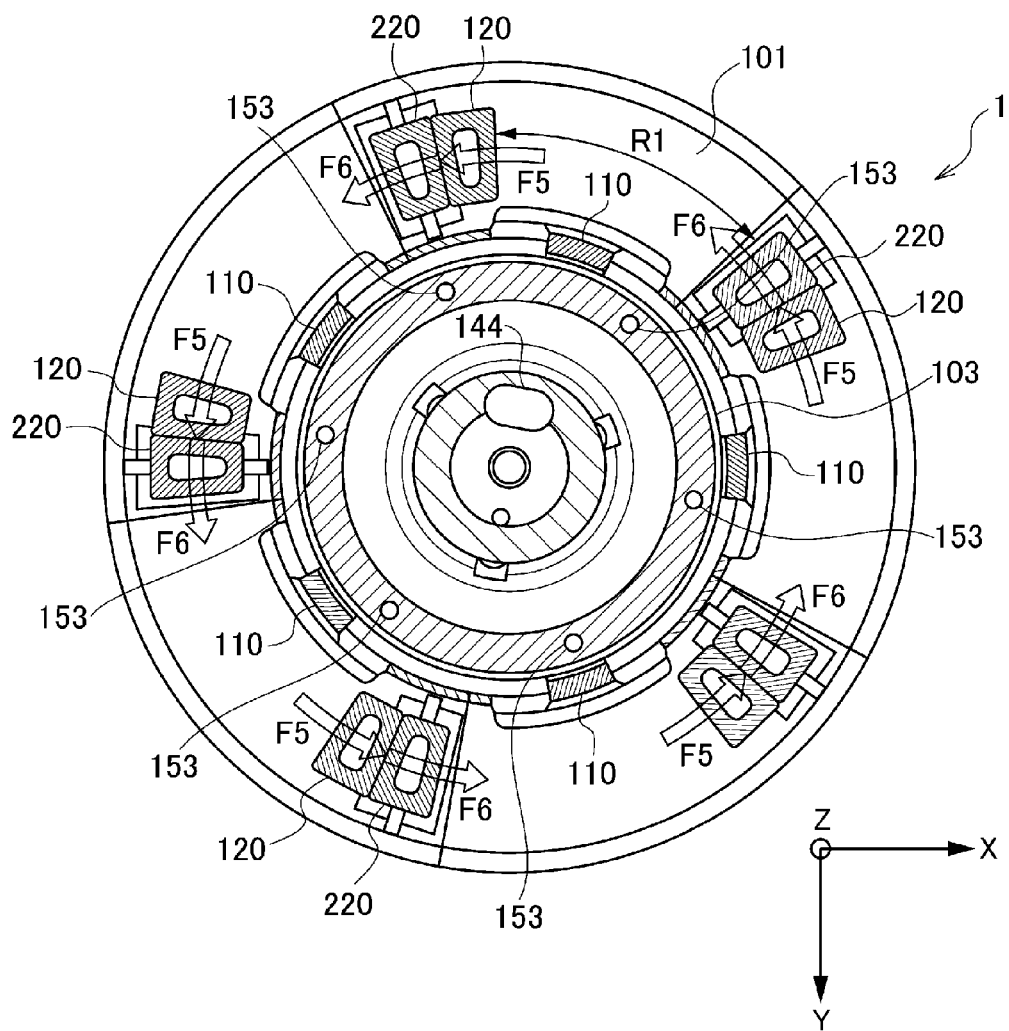
FIG. 12 is a horizontal sectional view to show a state in which the first coupling member and the second coupling member, which construct the coupling instrument according to the embodiment, are fixed to each other.

Here, the transmission of the power driven by the main body B will be described with reference to FIG. 12. FIG. 12 is a sectional view when viewed in a direction shown by arrows F-F in FIG. 9C.

As shown in FIG. 12, when the first coupling member 10 is rotated in a direction shown by an arrow F5 by the driving of the main body B, the first protruding part 120 is made adjacent to the second protruding part 220. The second protruding part 220 is moved in the direction shown by an arrow F6 in conjunction with the first protruding part 120, so that also the second coupling member 20 is rotated (see also FIG. 10C). In this way, in the coupling instrument 1, the power by the main body B fixed to the first coupling member 10 is transmitted to the cleaning part such as the brush C fixed to the second coupling member 20. In this way, the brush C can be rotated.

As described above in detail, in the coupling instrument 1 according to the present embodiment, the bulging part 100 of the first coupling member 10 can be loosely fitted in the fitted part 200 of the second coupling member 20 (again see FIG. 6 and the like), and the bulging part 100 includes the slant part 105 the side peripheral portion of which is tapered toward the tip (again see FIG. 3 and the like).

The operator of the cleaning device can fix the first coupling member 10 of the coupling instrument 1 to the main body B of the cleaning device and can fix the cleaning part such as the brush to the second coupling member 20. When the operator moves the first coupling member 10 while sliding the bulging part 100 on the second coupling member 20, the slant part 105 can be brought into contact with the outer edge of the fitted part 200 with the opening part 104 positioned above the fitted part 200 (see FIG. 9). In this way, the bulging part 100 is slid into the fitted part 200 with the slant part 105 being in contact with the outer edge of the fitted part 200, whereby the first coupling member 10 can be coupled to the second coupling member 20. Hence, in the coupling instrument 1, the first coupling member 10 can be easily coupled to the second coupling member 20 without a complicated operation.

Further, the second coupling member 20 has the plurality of engaging parts 210 arranged around the opening part of the fitted part 200 (again see FIG. 6 and the like). At least a single groove part 115 with which the engaging part 210 can engage are provided around the bulging part 100 (again see FIG. 6 and the like).

For this reason, the coupling instrument 1 can stably keep the state in which the first coupling member 10 is coupled to the second coupling member 20. Further, the engaging part 210 is bent by an external force to eliminate the state in which the first coupling member 10 is coupled to the second coupling member 20 (force to remove the first coupling member 10 from the second coupling member 20), so that the engaging state described above can be released. In this way, in the coupling instrument 1, the first coupling member 10 can be also easily removed from the second coupling member 20.

Further, the first coupling member 10 has the first protruding parts 120 formed in the protruding manner around the bulging part 100 having the shape of the circular truncated cone. Further, the second coupling member 20 has the second protruding parts 220 formed in the protruding manner around the opening part of the fitted part 200.

When the first coupling member 10 is rotated by the driving of the main body B, the second protruding parts 220 adjacent to the first protruding parts 120 are moved in conjunction with the first protruding parts 120, whereby the second coupling member 20 is rotated. For this reason, in the coupling instrument 1, the power of the cleaning device fixed to the first coupling member 10 can be transmitted to the cleaning part such as the brush and the pad fixed to the second coupling member 20.

Further, each of the first protruding parts 120 and the second protruding parts 220 has a face formed on the tip part thereof, the face being inclined in the direction in which the first coupling member 10 and the second coupling member 20 are rotated.

Even if the first protruding parts 120 and the second protruding parts 220 are brought into contact with each other when the first coupling member 10 is fixed to the second coupling member 20, they have only their tip parts brought into contact with each other. For this reason, the state in which the first protruding parts 120 and the second protruding parts 220 are brought into contact with each other can be released by the self weight of the first coupling member 10.

Further, in the coupling instrument 1, the engaging part 210 has the wall face part 212 capable of facing the side peripheral part of the bulging part 100. In the coupling instrument 1, the bulging part 100 can be rotated or moved while facing the wall face part 212. Still further, the engaging part 210 is formed at a tip part of the wall face part 212 and can also have the projecting part 213 capable of engaging with the groove part 115. The projecting part 213 can be formed in an appropriate shape shown in FIG. 8B and the like in such a way that even if the working of attaching or detaching the first coupling member 10 to or from the second coupling member 20 a plurality of times, the engaging part 210 is prevented from being broken.

In this regard, in the present embodiment, the case where the main body is fixed to the first coupling member 10 and where the cleaning part such as the brush and the pad is fixed to the second coupling member 20 has been described by way of example, but the coupling instrument 1 is not limited to the case. For example, the coupling instrument 1 may be constructed in such a way that the cleaning part is fixed to the first coupling member 10 and that the main body is fixed to the second coupling member 20.

REFERENCE SIGNS LIST

1: Coupling instrument
10: First coupling member
100: Bulging part
101: First base plate
110: Engaged member
115: Groove part
120: First protruding part
20: Second coupling member
200: Fitted part
201: Second base plate
210: Engaging part
212: Wall face part
213: Projecting part
220: Second protruding part
A: Cleaning device
B: Main body
C: Brush

The invention claimed is:

1. A cleaning device coupling instrument that can couple a main body of a cleaning device to a cleaning part to be fixed to the main body, the cleaning device coupling instrument comprising:
  a first coupling member including a bulging part having a slant part, a side peripheral part of the slant part being tapered toward a tip thereof, and a first protruding part formed in a protruding manner around the bulging part; and
  a second coupling member including a fitted part in which the bulging part can be loosely fitted and a second protruding part formed in a protruding manner around the fitted part, the second protruding part being adjacent to the first protruding part; and
  the second coupling member having a plurality of engaging parts arranged around the fitted part; and
  the bulging part having a shape of a circular truncated cone and at least a single groove part, with which the engaging parts can engage, provided around itself; and
  the first protruding part having a tip part formed in a protruding manner in a direction in which the first protruding part protrudes, the tip part is inclined toward a radial direction with respect to a rotation axis of the first coupling member and having a peak part formed at an end on the rotation axis of the first coupling member and a face being slanted in a direction in which the first coupling member is rotated; and
  the second protruding part having a tip part formed in a protruding manner in a direction in which the second protruding part protrudes, the tip part is inclined toward a radial direction with respect to a rotation axis of the second coupling member and having a peak part formed at an end on the rotation axis of the second coupling member and a face being slanted in a direction in which the second coupling member is rotated.

2. The cleaning device coupling instrument according to claim 1, wherein the engaging parts have:
  a wall face part capable of facing a side peripheral part of the bulging part, and
  a projecting part formed at a tip part thereof and capable of engaging with the groove part.

3. A cleaning device comprising a coupling instrument including:
  a main body;
  a cleaning part fixed to the main body, and
  a cleaning device coupling instrument as defined in claim 1.

* * * * *